US010523337B2

(12) United States Patent
De Dobbelaere et al.

(10) Patent No.: US 10,523,337 B2
(45) Date of Patent: *Dec. 31, 2019

(54) METHOD AND SYSTEM FOR LARGE SILICON PHOTONIC INTERPOSERS BY STITCHING

(71) Applicant: Luxtera, Inc., Carlsbad, CA (US)

(72) Inventors: Peter De Dobbelaere, San Diego, CA (US); Attila Mekis, Carlsbad, CA (US); Gianlorenzo Masini, Carlsbad, CA (US)

(73) Assignee: Luxtera, Inc., Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/353,591

(22) Filed: Mar. 14, 2019

(65) Prior Publication Data
US 2019/0215079 A1 Jul. 11, 2019

Related U.S. Application Data

(63) Continuation of application No. 15/950,876, filed on Apr. 11, 2018, now Pat. No. 10,236,996, which is a (Continued)

(51) Int. Cl.
*G02B 6/43* (2006.01)
*H04B 10/80* (2013.01)
(Continued)

(52) U.S. Cl.
CPC ......... *H04B 10/801* (2013.01); *G02B 6/1228* (2013.01); *G02B 6/34* (2013.01);
(Continued)

(58) Field of Classification Search
CPC combination set(s) only.
See application file for complete search history.

(56) References Cited

U.S. PATENT DOCUMENTS

2009/0302394 A1* 12/2009 Fujita .................. H01L 27/0688
257/369
2013/0122672 A1* 5/2013 Or-Bach ............. H01L 21/8221
438/199
(Continued)

*Primary Examiner* — Omar S Ismail
(74) *Attorney, Agent, or Firm* — McAndrews, Held & Malloy

(57) ABSTRACT

Methods and systems for large silicon photonic interposers by stitching are disclosed and may include, in an optical communication system including a silicon photonic interposer, where the interposer includes a plurality of reticle sections: communicating an optical signal between two of the plurality of reticle sections utilizing a waveguide. The waveguide may include a taper region at a boundary between the two reticle sections, the taper region expanding an optical mode of the communicated optical signal prior to the boundary and narrowing the optical mode after the boundary. A continuous wave (CW) optical signal may be received in a first of the reticle sections from an optical source external to the interposer. The CW optical signal may be received in the interposer from an optical source assembly coupled to a grating coupler in the first of the reticle sections in the silicon photonic interposer.

20 Claims, 8 Drawing Sheets

Related U.S. Application Data continuation of application No. 15/171,233, filed on Jun. 2, 2016, now Pat. No. 9,948,402.

(60) Provisional application No. 62/230,290, filed on Jun. 2, 2015.

(51) Int. Cl.
*G02B 6/42* (2006.01)
*G02B 6/122* (2006.01)
*G02B 6/34* (2006.01)

(52) U.S. Cl.
CPC .............. *G02B 6/4279* (2013.01); *G02B 6/43* (2013.01); *G02B 6/428* (2013.01); *G02B 6/4292* (2013.01)

(56) References Cited

U.S. PATENT DOCUMENTS

| | | | | |
|---|---|---|---|---|
| 2013/0142211 A1* | 6/2013 | Doany | ................. | G02B 6/4246 |
| | | | | 372/50.12 |
| 2013/0279844 A1* | 10/2013 | Na | ........................... | G02B 6/12 |
| | | | | 385/14 |
| 2014/0294342 A1* | 10/2014 | Offrein | ................ | G02B 6/4214 |
| | | | | 385/14 |
| 2015/0108506 A1* | 4/2015 | Zhang | .................... | H01L 31/18 |
| | | | | 257/81 |
| 2015/0341119 A1* | 11/2015 | Fincato | ................ | H04B 10/801 |
| | | | | 398/139 |

\* cited by examiner

METHOD AND SYSTEM FOR LARGE SILICON PHOTONIC INTERPOSERS BY STITCHING

CROSS-REFERENCE TO RELATED APPLICATIONS/INCORPORATION BY REFERENCE

This application is a continuation of U.S. application Ser. No. 15/950,876 filed on Apr. 11, 2018, which is a continuation of U.S. application Ser. No. 15/171,233 filed on Jun. 2, 2016, now U.S. Pat. No. 9,948,402, which makes reference to and claims priority to U.S. Provisional Application Ser. No. 62/230,290 filed on Jun. 2, 2015. This application also makes reference to U.S. application Ser. No. 13/422,776, filed on Mar. 16, 2012. Each of the above stated applications is hereby incorporated herein by reference in its entirety.

FEDERALLY SPONSORED RESEARCH OR DEVELOPMENT

[Not Applicable]

MICROFICHE/COPYRIGHT REFERENCE

[Not Applicable]

FIELD

Certain embodiments of the disclosure relate to semiconductor processing. More specifically, certain embodiments of the disclosure relate to a method and system for large silicon photonic interposers by stitching.

BACKGROUND

As data networks scale to meet ever-increasing bandwidth requirements, the shortcomings of copper data channels are becoming apparent. Signal attenuation and crosstalk due to radiated electromagnetic energy are the main impediments encountered by designers of such systems. They can be mitigated to some extent with equalization, coding, and shielding, but these techniques require considerable power, complexity, and cable bulk penalties while offering only modest improvements in reach and very limited scalability. Free of such channel limitations, optical communication has been recognized as the successor to copper links.

Further limitations and disadvantages of conventional and traditional approaches will become apparent to one of skill in the art, through comparison of such systems with the present disclosure as set forth in the remainder of the present application with reference to the drawings.

BRIEF SUMMARY OF THE DISCLOSURE

A system and/or method for large silicon photonic interposers by stitching, substantially as shown in and/or described in connection with at least one of the figures, as set forth more completely in the claims.

Various advantages, aspects and novel features of the present disclosure, as well as details of an illustrated embodiment thereof, will be more fully understood from the following description and drawings.

DETAILED DESCRIPTION OF THE DISCLOSURE

Certain aspects of the disclosure may be found in a method and system for large silicon photonic interposers by stitching. Example aspects of the disclosure may comprise an integrated optical communication system comprising one or more complementary metal-oxide semiconductor (CMOS) electronics die coupled to a silicon photonic interposer, where the silicon photonic interposer comprises a plurality of reticle sections and where the integrated optical communication system is operable to communicate an optical signal between two of the plurality of reticle sections utilizing a waveguide. The waveguide may comprise a taper region at a boundary between the two reticle sections, the taper region expanding an optical mode of the communicated optical signal prior to the boundary and narrowing the optical mode after the boundary. A continuous wave (CW) optical signal may be received in a first of the plurality of reticle sections in the silicon photonic interposer from an optical source external to the silicon photonic interposer. The CW optical signal may be received in the silicon photonic interposer from an optical source assembly coupled to a grating coupler in the first reticle section in the silicon photonic interposer. The CW optical signal may be communicated from the first reticle section to a second reticle section utilizing a second waveguide. A modulated optical signal may be generated by processing the received CW optical signal based on a first electrical signal received from one of the CMOS electronics die. The received CW optical signal may be processed utilizing an optical modulator in the silicon photonic interposer. The generated modulated optical signal may be communicated between two of the plurality of reticle sections. A second electrical signal may be generated in the silicon photonic interposer using a photodetector integrated in the silicon photonic interposer. The CW optical signal may be received from an optical fiber coupled to one of the reticle sections of the silicon photonic interposer. The taper region may comprise a region of expansion increasing from a first width up to a second width, a region extending across the boundary between the two reticle sections at the second width, and a region tapering back down to the first width.

Figure 1:
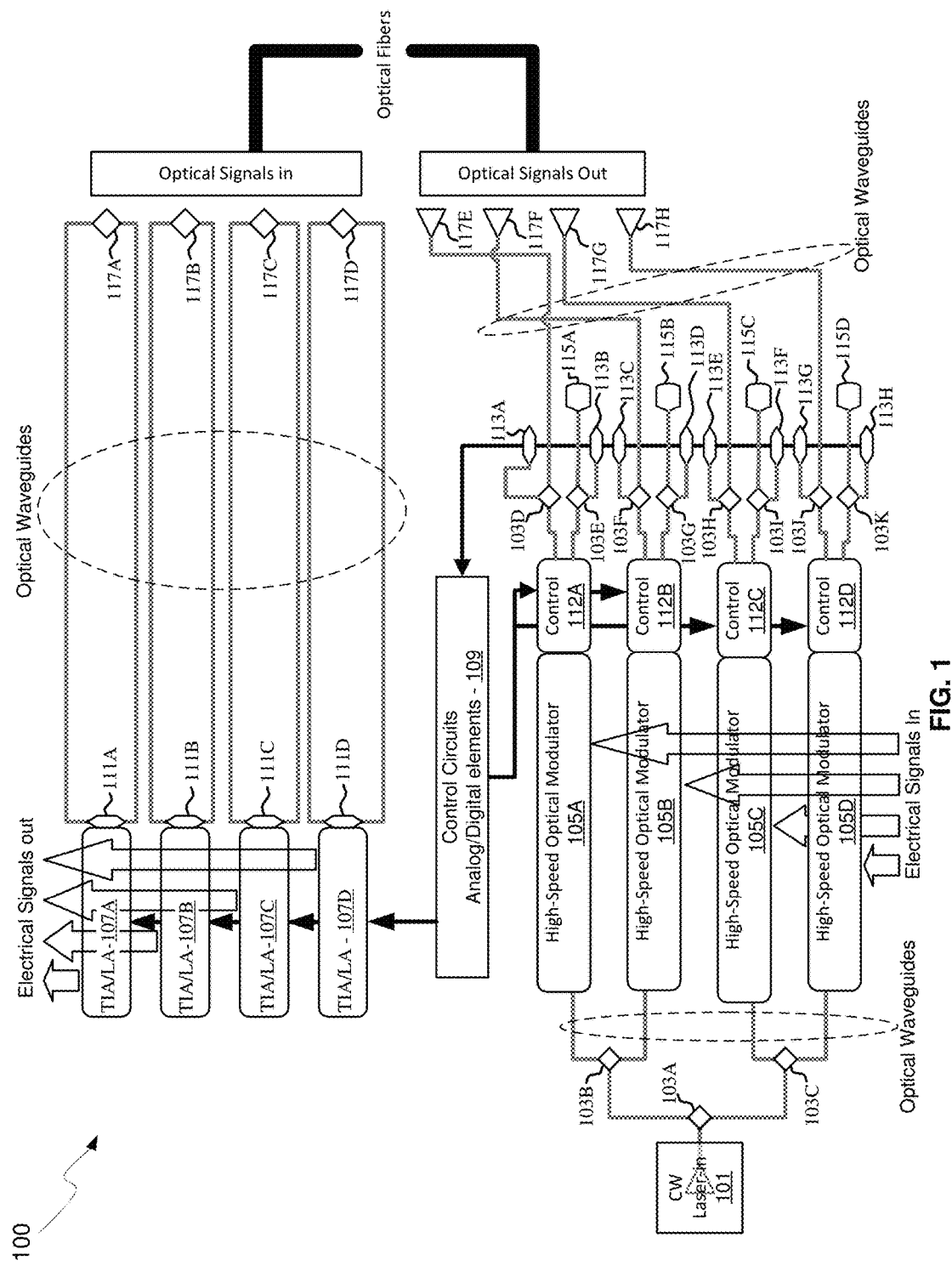
FIG. 1 is a block diagram of a CMOS transceiver utilizing stitched photonic interposers, in accordance with an embodiment of the disclosure.

FIG. 1 is a block diagram of a CMOS transceiver utilizing stitched photonic interposers, in accordance with an embodiment of the disclosure. Referring to FIG. 1, there is shown optoelectronic devices in a transceiver 100 comprising high speed optical modulators 105A-105D, high-speed photodiodes 111A-111D, monitor photodiodes 113A-113H, and optical devices comprising taps 103A-103K, optical terminations 115A-115D, and grating couplers 117A-117H. There are also shown electrical devices and circuits comprising transimpedance and limiting amplifiers (TIA/LAs) 107A-107E, analog and digital control circuits 109, and control sections 112A-112D. Optical signals are communicated between optical and optoelectronic devices via optical waveguides fabricated in a CMOS interposer chip, with the optical waveguides being indicated in FIG. 1 by the dashed ovals. Optical and optoelectronic devices are integrated in a silicon photonic interposer while electronic devices are integrated into one or more CMOS electronics chips that are coupled to the silicon photonic interposer.

The high speed optical modulators 105A-105D comprise Mach-Zehnder or ring modulators, for example, and enable the modulation of the CW laser input signal. The high speed optical modulators 105A-105D are controlled by the control sections 112A-112D, and the outputs of the modulators are optically coupled via waveguides to the grating couplers 117E-117H. The taps 103D-103K comprise four-port optical couplers, for example, and are utilized to sample the optical signals generated by the high speed optical modulators 105A-105D, with the sampled signals being measured by the monitor photodiodes 113A-113H. The unused branches of the taps 103D-103K are terminated by optical terminations 115A-115D to avoid back reflections of unwanted signals.

The grating couplers 117A-117H comprise optical gratings that enable coupling of light into and out of the silicon photonic interposer. The grating couplers 117A-117D may be utilized to couple light received from optical fibers into the silicon photonic interposer, and may comprise polarization independent grating couplers. The grating couplers 117E-117H may be utilized to couple light from the silicon photonic interposer into optical fibers. The optical fibers may be epoxied, for example, to the CMOS chip, and may be aligned at an angle from normal to the surface of the silicon photonic interposer to optimize coupling efficiency.

The high-speed photodiodes 111A-111D convert optical signals received from the grating couplers 117A-117D into electrical signals that are communicated to the TIA/LAs 107A-107D for processing. The analog and digital control circuits 109 may control gain levels or other parameters in the operation of the TIA/LAs 107A-107D. The TIA/LAs 107A-107D, the analog and digital control circuits 109, and the control sections 112A-112D may be integrated on one or more electronics CMOS chips that may be bonded to the silicon photonic interposer via copper pillars. In this manner, electronic and photonic performance may be optimized independently on different CMOS nodes. The TIA/LAs 107A-107D may then communicate electrical signals to other circuitry on the electronics chip.

The TIA/LAs 107A-107D may comprise narrowband, non-linear optoelectronic receiver circuitry. Accordingly, the narrowband receiver front-end may be followed by a restorer circuit, such as, for example, a non-return to zero (NRZ) level restorer circuit. A restorer circuit limits the bandwidth of the optical receiver in order to decrease the integrated noise, thereby increasing the signal to noise ratio. An NRZ level restorer may be used to convert the resulting data pulses back into NRZ data.

The control sections 112A-112D comprise electronic circuitry that enable modulation of the CW laser signal received from the taps 103A-103C. The high speed optical modulators 105A-105D require high-speed electrical signals to modulate the refractive index in respective branches of a Mach-Zehnder interferometer (MZI), for example.

In an embodiment of the disclosure, the integration of all optical and optoelectronic devices required for a transceiver into a silicon photonic interposer, and of all required electronic devices on one or more CMOS electronics chips, enables optimized performance of the resulting single hybrid package. In this manner, electronic device performance may be optimized independently of the optimization of photonic devices in the silicon photonic interposer or interposers. For example, the electronic CMOS chip may be optimized on a 32 nm CMOS process, while the silicon photonic interposer may be optimized on a 130 nm CMOS node. The electronics devices may be placed on the electronics chip such that they are located directly above their associated photonics devices when bonded to the silicon photonic interposer. For example, the control sections 112A-112D may be located on an electronics CMOS chip such that they lie directly above the high-speed optical modulators 105A-105B and can be coupled by low parasitic copper pillars.

In an example scenario, the interposer may need to be quite large and in some cases larger than the reticle size used in common photolithography processes. Stitching of reticles may enable larger electronic interposers by multiple exposures of a wafer with different masks. It is known that there will always be a stitching error (=a small offset between the pattern on the neighboring reticle prints due to inaccuracies between the alignment between the different prints). For electronic interconnect applications this is no major problem, however for silicon photonics optical interconnect waveguides this may be a major problem, even minute offsets can cause huge insertion losses and parasitic reflections and crosstalk.

A first way to overcome this problem with silicon photonics is to ensure that there are no waveguides crossing between printed areas. A second way to overcome this, is to make the waveguides near the crossover point between the two neighboring reticles less sensitive for lateral misalignment. One suitable way to accomplish this, is to increase the mode size in that area, for instance by tapering the waveguide. This significantly reduces the coupling losses.

In an example embodiment, the hybrid transceiver 100 comprises four optoelectronic transceivers with one optical source, and enables communication of optical signals vertically to and from the surface of the silicon photonic interposers, thereby enabling the use of CMOS processes and structures, including a CMOS guard ring. The silicon photonic interposer may comprise both active devices, such as photodetectors and modulators, and passive devices, such as waveguides, splitters, combiners, and grating couplers, thereby enabling photonic circuits to be integrated on CMOS chips. In an example scenario, the interposer may comprise a large area structure comprising a plurality of reticle areas, interposers, or sub-interposers with tapered waveguides at the interfaces between reticle areas/interposers/sub-interposers for improved modal overlap. In the following description, the separate areas of the interposer may be considered either separate interposers or separate sections/reticle areas of the same interposer, fabricated using a single wafer.

Figure 2A:
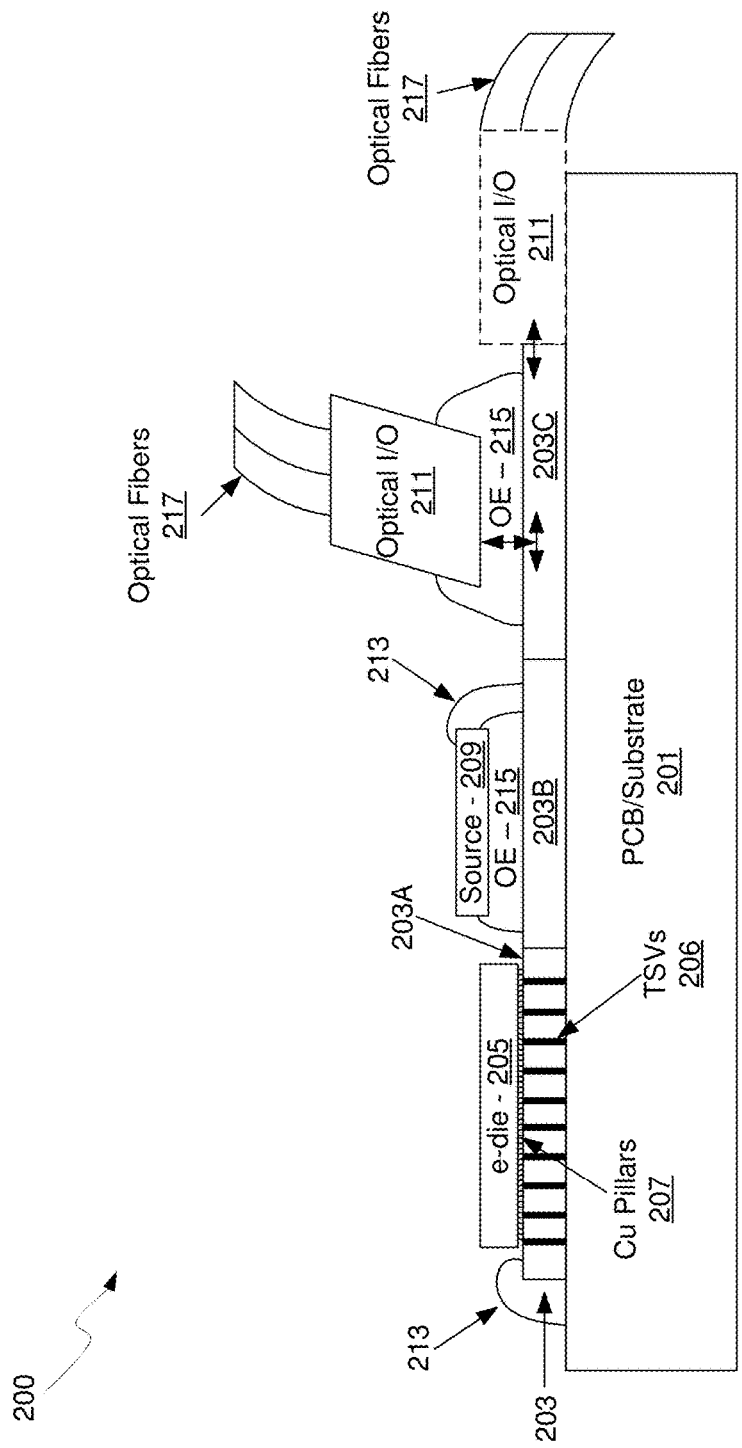
FIG. 2A is a schematic illustrating an example optical transceiver including a large area photonic interposer, in accordance with an embodiment of the disclosure.

FIG. 2A is a schematic illustrating an example optical transceiver including a large area photonic interposer, in accordance with an embodiment of the disclosure. Referring to FIG. 2A, there is shown a photonic transceiver 200 comprising a printed circuit board (PCB)/substrate 201, a silicon photonic interposer 203, an electronic CMOS die 205, through silicon vias (TSVs) 206, copper pillars 207, an optical source module 209, an optical input/output (I/O) 211, wire bonds 213, optical epoxy 215, and optical fibers 217.

The PCB/substrate 201 may comprise a support structure for the photonic transceiver 200, and may comprise both insulating and conductive material for isolating devices as well as providing electrical contact for active devices on the silicon photonic interposer 203 as well as to devices on the electronics die 205 via the silicon photonic interposer 203. In addition, the PCB/substrate may provide a thermally conductive path to carry away heat generated by devices and circuits in the electronics die 205 and the optical source module 209.

The silicon photonic interposer 203 may comprise a CMOS chip with active and passive optical devices such as waveguides, modulators, photodetectors, grating couplers, taps, and combiners, for example. In an example scenario, the interposer 203 may comprise a plurality of reticle sections 203A-203C, although the number is not limited to three, as this only indicates three sections in the particular cross-section. The functionalities supported by the silicon photonic interposer 203 may comprise photo-detection, optical modulation, optical routing, and optical interfaces for high-speed I/O and optical power delivery. The reticle sections 203A-203C may each comprise a section of the interposer formed in a mask step, where a different reticle may be used for each section due to the large overall size of the interposer 203. To avoid optical losses due to mismatches at the interfaces between reticle sections 203A-203C, optical waveguides may be tapered to broaden the optical modes at the interfaces and then taper back down away from the interfaces.

The silicon photonic interposer 203 may also comprise copper pillars 207 for coupling the electronics die 205 to the silicon photonic interposer 203, as well as grating couplers for coupling light into the die from the optical source module 209 and into/out of the die via the optical I/O 211. In addition, the silicon photonic interposer 203 may comprise TSVs 206 for electrical interconnection through the die, such as between the PCB/substrate 201 and the electronics die 205. Optical interfaces may also be facilitated by the optical epoxy 215, providing both optical transparency and mechanical fixation.

The electronics die 205 may comprise one or more electronic CMOS chips that provide the required electronic functions of the photonic transceiver 200. The electronics die 205 may comprise a single chip or a plurality of die coupled to the silicon photonic interposer 203 via the copper pillars 207. The electronics die 205 may comprise TIA's, LNAs, and control circuits for processing optical signals in the photonics chip 203. For example, the electronics die 205 may comprise driver circuitry for controlling optical modulators in the silicon photonic interposer 203 and variable gain amplifiers for amplifying electrical signals received from photodetectors in the silicon photonic interposer 203. By incorporating photonics devices in the silicon photonic interposer 203 and electronic devices in the electronics die 205, the CMOS processes for each chip may be optimized for the type of devices incorporated.

The TSVs 206 may comprise electrically conductive paths that extend vertically through the silicon photonic interposer 203 and provide electrical connectivity between the electronics die 205 and the PCB/substrate 201. This may be utilized in place of wire bonds, such as the wire bonds 213, or in conjunction with wire bonds.

The copper pillars 207 may comprise linear or 2D arrays of metal pillars to provide electrical contact between the silicon photonic interposer 203 and the electronics die 205. For example, the copper pillars 207 may provide electrical contact between photodetectors in the silicon photonic interposer 203 and associated receiver circuitry in the electronics die 205. In addition, the copper pillars 207 may provide mechanical coupling of the electronics and photonics die, and may be encapsulated with underfill to protect the metal and other surfaces.

The optical source module 209 may comprise an assembly with an optical source, such as a semiconductor laser, and associated optical and electrical elements to direct one or more optical signals into the silicon photonic interposer 203. An example of the optical source module is described in U.S. patent application Ser. No. 12/500,465 filed on Jul. 9, 2009, which is hereby incorporated herein by reference in its entirety. In another example scenario, the optical signal or signals from the optical source assembly 209 may be coupled into the silicon photonic interposer 203 via optical fibers affixed above grating couplers in the silicon photonic interposer 203.

The optical I/O 211 may comprise an assembly for coupling the optical fibers 217 to the silicon photonic interposer 203. Accordingly, the optical I/O 211 may comprise mechanical support for one or more optical fibers and an optical surface to be coupled to the silicon photonic interposer 203, such as by the optical epoxy 215. In another example scenario, the optical I/O 211 may also be affixed along an edge of the silicon photonic interposer 203, as shown by the dashed line optical I/O 211, enabling the coupling of optical signals directly into optical waveguides as opposed to grating couplers on the surface of the silicon photonic interposer 203.

In operation, continuous-wave (CW) optical signals may be communicated into the silicon photonic interposer 203 from the optical source module 209 via one or more grating couplers in the silicon photonic interposer 203. Photonic devices in the silicon photonic interposer 203 may then process the received optical signal. For example, one or more optical modulators may modulate the CW signal based on electrical signals received from the electronics die 205. Electrical signals may be received from the electronics die 205 via the Cu pillars 207. By integrating modulators in the silicon photonic interposer 203 directly beneath the source of the electrical signals in the electronics die 205, signal path lengths may be minimized, resulting in very high speed performance. For example, utilizing ~20 micron Cu pillars with <20 fF capacitance, speeds of 50 GHz and higher can be achieved.

The modulated optical signals may then be communicated out of the silicon photonic interposer 203 via grating couplers situated beneath the optical I/O 211. In this manner, high-speed electrical signals generated in the electronics die 205 may be utilized to modulate a CW optical signal and subsequently communicated out of the silicon photonic interposer 203 via the optical fibers 217.

Similarly, modulated optical signals may be received in the silicon photonic interposer 203 via the optical fibers 217 and the optical I/O 211. The received optical signals may be communicated within the silicon photonic interposer 203 via optical waveguides to one or more photodetectors integrated in the silicon photonic interposer 203. The photodetectors may be integrated in the silicon photonic interposer 203 such that they lie directly beneath the associated receiver electronics circuitry in the electronics die 205 when bonded and electrically coupled by the low parasitic capacitance Cu pillars 207.

The hybrid integration of CMOS electronics die on silicon photonic interposer via Cu pillars enables very high speed optical transceivers utilizing CMOS processes. In addition, integrating separate photonic and electronic die enables the independent optimization of the performance of electronic and photonic functions within the respective CMOS processes. The electronic die, which is mounted by face-to-face bonding to the silicon photonic interposer, may contain electrical circuits that "drive" the photonic circuits on the interposer. Those circuits replace the electronic signaling drive circuits from conventional electrical interconnect solutions.

In addition, optical interconnect between multiple electronic die, i.e. chip-to-chip interconnect, is enabled by the silicon photonic interposer 203, where transceiver functions are supported by the combined electronic die and interposer and the associated optical routing on the silicon photonic interposer die 203. The disclosure is not limited to the arrangement shown in FIG. 2A. Accordingly, various stacking arrangements are possible. For example, photonic interposers may be sandwiched between electronic chips and stacks of interposers/electronic chips may be configured resulting in a 3-dimensional structure.

Figure 2B:
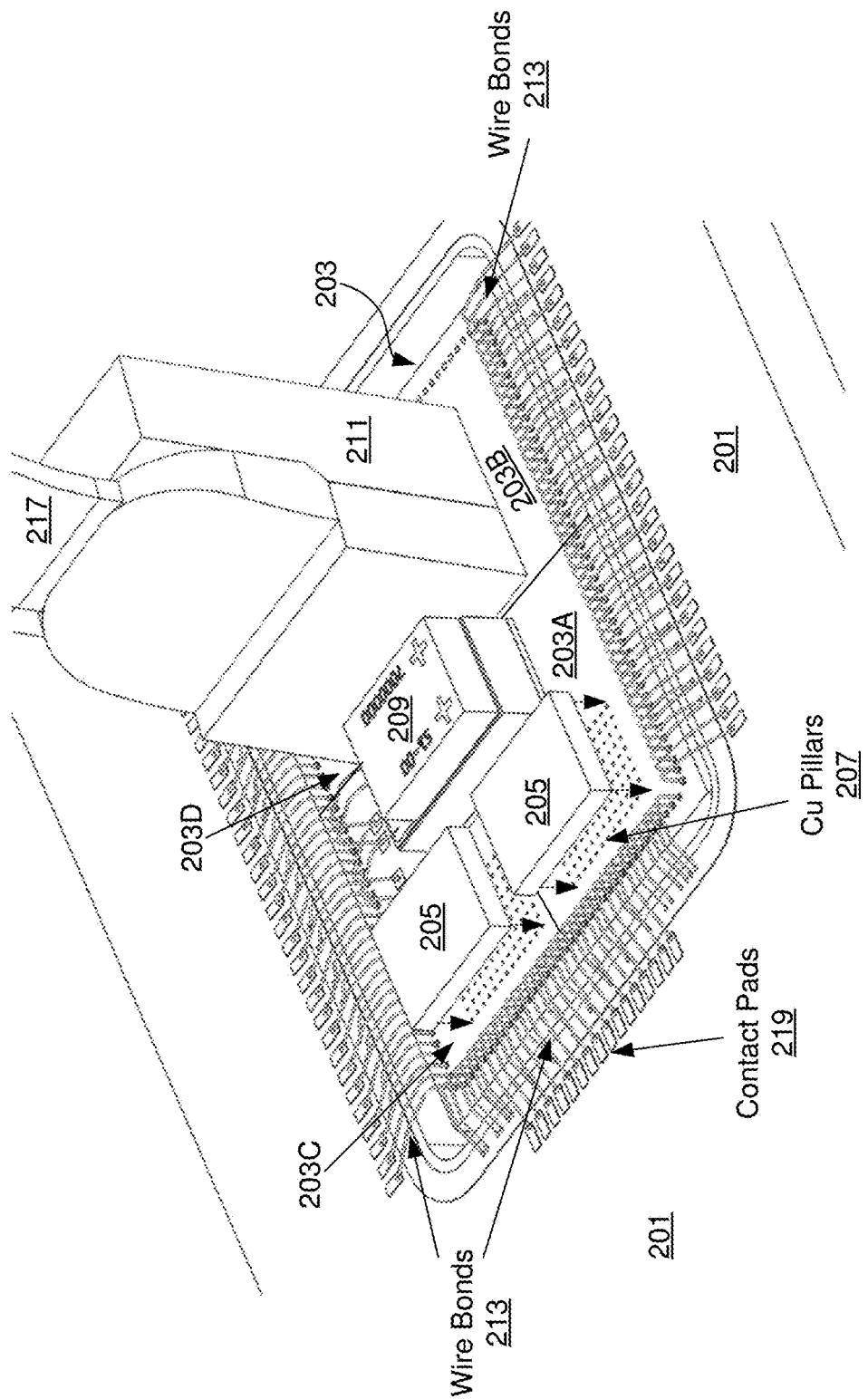
FIG. 2B is a perspective view of a hybrid integration photonic transceiver, in accordance with an embodiment of the disclosure.

FIG. 2B is a perspective view of a hybrid integration photonic transceiver, in accordance with an embodiment of the disclosure. Referring to FIG. 2B, there is shown the PCB/substrate 201, the silicon photonic interposer 203, electronics die 205, the Cu pillars 207, the optical source assembly 209, the optical I/o 211, wire bonds 213, optical fibers 217, and contact pads 219.

The electronics die 205 are shown prior to bonding to the surface of the silicon photonic interposer 203 via the Cu pillars 207, as illustrated by the dashed arrows below each die. While two electronics die 205 are shown in FIG. 2B, it should be noted that the disclosure is not so limited. Accordingly, any number of electronics die may be coupled to the silicon photonic interposer 203 depending on the number of transceivers, the particular CMOS node utilized, thermal conductance, and space limitations, for example.

In another example embodiment, the optical source assembly 209 may be located remotely and one or more optical fibers may be utilized to couple the optical source signal into the silicon photonic interposer 203 via grating couplers, for example.

In an example embodiment, electronic functions may be integrated into the electronics die 205 and photonics circuitry may be integrated into the silicon photonic interposer 203 utilizing independent CMOS processes. The electronics die 205 may comprise electronic devices associated with photonic devices in the silicon photonic interposer 203, thereby minimizing electrical path lengths while still allowing independent performance optimization of electronic and photonic devices. For example, the CMOS processes that result in the highest electronics performance, such as the fastest switching speed, may not be optimum for CMOS photonics performance. Similarly, different technologies may be incorporated in the different die. For example, SiGe CMOS processes may be used for photonic devices such as photodetectors, and 32 nm CMOS processes may be used for electronic devices on the electronics die 205.

The silicon photonic interposer 203 may comprise photonic circuits, whereby optical signals may be received, processed, and transmitted out of the silicon photonic interposer 203. In an example scenario, the interposer 203 may comprise a plurality of reticle sections 203A-203D, although the number is not limited to four, as this is merely an example. The functionalities supported by the silicon photonic interposer 203 may comprise photo-detection, optical modulation, optical routing, and optical interfaces for high-speed I/O and optical power delivery. The reticle sections 203A-203D may each comprise a section of the interposer formed in a mask step, where a different reticle may be used for each section due to the large overall size of the interposer 203. To avoid optical losses due to possible mismatches at the interfaces between reticle sections 203A-203C, optical waveguides may be tapered to broaden the optical modes at the interfaces and then taper back down away from the interfaces.

The optical source assembly 209 may provide a CW optical signal to the silicon photonic interposer 203, with the photonics circuitry in the silicon photonic interposer 203 processing the CW signal. For example, the CW signal may be coupled into the silicon photonic interposer 203 via grating couplers, communicated to various locations on the die via optical waveguides, modulated by Mach-Zehnder interferometer (MZI) modulators, and communicated out of the silicon photonic interposer 203 into optical fibers. In this manner, the hybrid integration of a plurality of high performance optical transceivers is enabled in CMOS processes.

In another example scenario, the silicon photonic interposer 203 may provide optical routing between electronics die. For example, the electronics die 205 may comprise a plurality of processors and memory die. Electrical signals from the electronics die 205 may be communicated to modulators on the silicon photonic interposer 203 via copper pillars, for example, and converted to optical signals for routing to another electronics die via optical waveguides before being converted back to electronic signals utilizing photodetectors. In this manner, very high-speed coupling is enabled for a plurality of electronics die, reducing the memory requirements on processor chips, for example.

The utilization of optical signals for interconnecting electronics die enables very dense and low power interconnects, since no controlled impedance lines are necessary. Furthermore, costs may be reduced with integration on a photonics-only die since there is thus no power dissipation die in the interposer, and the electronics die may be heat sinked with conventional methods.

Figure 2C:
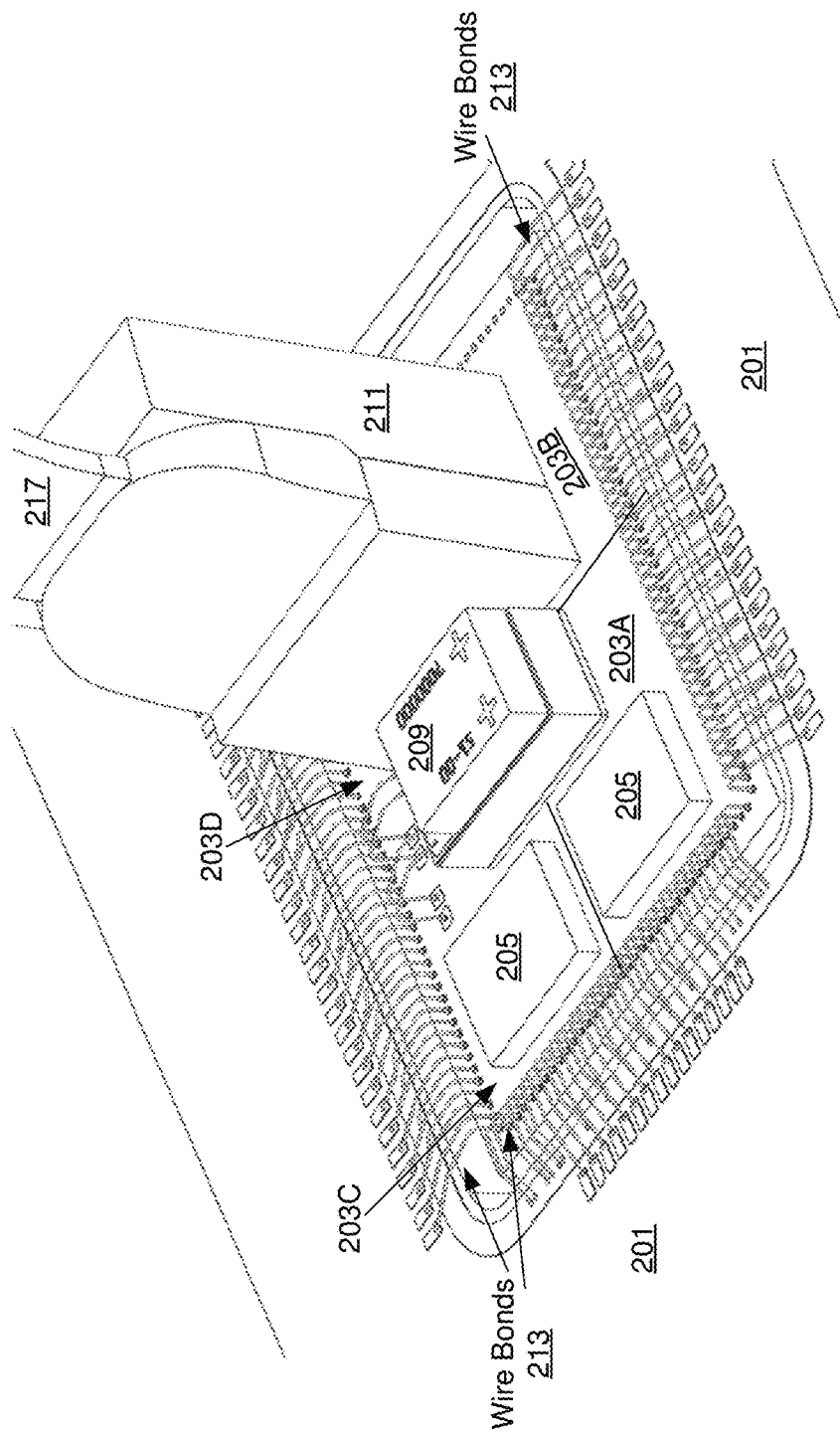
FIG. 2C is a perspective view of a large area photonic interposer comprising multiple sections and with two coupled electronics die, in accordance with an embodiment of the disclosure.

FIG. 2C is a perspective view of a large area photonic interposer comprising multiple sections and with two coupled electronics die, in accordance with an embodiment of the disclosure. Referring to FIG. 2C, there is shown the PCB/substrate 201, the silicon photonic interposer 203, electronics die 205, the optical source assembly 209, the optical I/O 211, wire bonds 213, and optical fibers 217.

The electronics die 205 are shown bonded to the surface of the silicon photonic interposer 203 via Cu pillars. While two electronics die 205 are shown in FIG. 2C, it should again be noted that the disclosure is not necessarily so limited. Accordingly, any number of electronics die may be coupled to the silicon photonic interposer 203 depending on number of transceivers, the particular CMOS node utilized, thermal conductance, and space limitations, for example.

In an example embodiment, electronic functions may be integrated into the electronics die 205 and photonics circuitry may be integrated into the silicon photonic interposer 203 utilizing independent CMOS processes. The electronics die 205 may comprise electronic devices associated with photonic devices in the silicon photonic interposer 203, thereby minimizing electrical path lengths while still allowing independent performance optimization of electronic and photonic devices. Different technologies may be incorporated in the different die. For example, SiGe CMOS processes may be used for photonic devices in the silicon photonic interposer 203, such as photodetectors and modulators, and 32 nm CMOS processes may be used for electronic devices on the electronics die 205.

In another example scenario, one of the electronics die 205 may comprise a conventional application specific integrated circuit (ASIC) and a second electronics die 205 may comprise a driver die with circuitry for driving the photonics devices in the silicon photonic interposer 203. Accordingly, the driver die may receive electronic signals from the ASIC via the silicon photonic interposer 203 and use the received signals to subsequently drive photonic devices in the silicon photonic interposer 203. In this manner, the second die provides the driver circuitry as opposed to integrating driver circuitry in the ASIC. This may allow existing ASIC designs to be integrated with the silicon photonic interposer 203 without any modification to the ASIC I/O circuitry. These example embodiments are illustrated further with respect to FIGS. 5B and 5C.

The silicon photonic interposer 203 may comprise photonic circuits, whereby optical signals may be received, processed, and transmitted out of the silicon photonic interposer 203. The optical source assembly 209 may provide a CW optical signal to the silicon photonic interposer 203 and biased by voltages coupled to the optical source assembly 209 via wire bonds 213. Photonics circuitry in the silicon photonic interposer 203 may then process the CW signal. For example, the CW signal may be coupled into the silicon photonic interposer 203 via grating couplers, communicated to various locations on the die via optical waveguides, modulated by MZI modulators, and communicated out of the silicon photonic interposer 203 into the optical fibers 217 via the optical I/O 211.

As described above, the interposer 203 may comprise a plurality of reticle sections 203A-203D, although the number is not limited to four, as this is merely an example. The functionalities supported by the silicon photonic interposer 203 may comprise photo-detection, optical modulation, optical routing, and optical interfaces for high-speed I/O and optical power delivery. The reticle sections 203A-203D may each comprise a section of the interposer formed in a mask step, where a different reticle may be used for each section due to the large overall size of the interposer 203. To avoid optical losses due to possible mismatches at the interfaces between reticle sections 203A-203C, optical waveguides may be tapered to broaden the optical modes at the interfaces and then taper back down away from the interfaces.

Heat may be conducted away from the die via the PCB/substrate 201. In this manner, the silicon photonic interposer and electronics die 205 may enable a plurality of high performance optical transceivers using separately optimized CMOS processes. Similarly, the silicon photonic interposer 203 may enable high-speed interconnects between electronic circuits in the electronics die 205, such as between processor cores and memory, for example.

Figure 3:
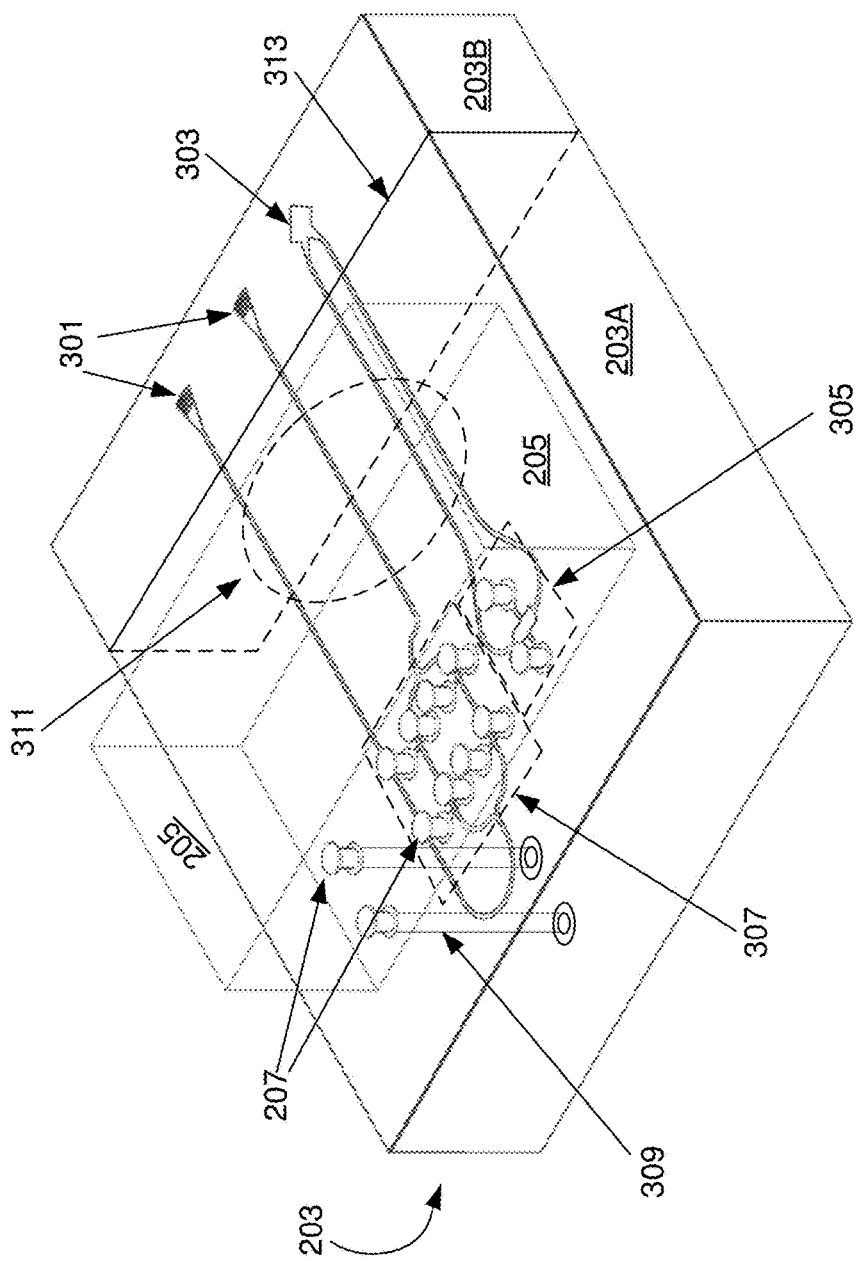
FIG. 3 is a schematic illustrating the hybrid integration of an electronics die to a large area photonics interposer comprising multiple sections, in accordance with an embodiment of the disclosure.

FIG. 3 is a schematic illustrating the hybrid integration of an electronics die to a large area photonics interposer comprise multiple sections, in accordance with an embodiment of the disclosure. Referring to FIG. 3, there is shown the electronics die 205, copper pillars 207, and the silicon photonic interposer 203. The silicon photonic interposer 203 may comprise different sections 203A and 203B, which in an example scenario comprise different reticle sections, where each section may comprise grating couplers 301, polarization splitting grating couplers 303, photodetectors 305, optical modulators 307, TSVs 309, and optical waveguides 311.

The Cu pillars 207 provide both electrical and mechanical coupling between the electronics die 205 and the silicon photonic interposer 203. The grating couplers 301 provide for the coupling of light into and/or out of the photonics die/interposer 300. Similarly, the polarization-splitting grating coupler 303 may enable the coupling of two polarizations of light into and/or out of the photonics die/interposer 300.

The modulator 307 may comprise a MZI modulator, for example, and may be operable to modulate an optical signal based on electrical signals received from the electronics die 205 via the Cu pillars 207. In an example scenario, a CW optical signal may be received from an optical source via one of the grating couplers 301, communicated via the optical waveguides 311, modulated by the optical modulator 307, communicated back by the optical waveguides 311, and out of the silicon photonic interposer 203 via the other grating coupler 301.

The photodetector 305 may comprise a semiconductor photodiode, for example, and may be operable to convert a received optical signal to an electrical signal. In an example scenario, optical signals with perpendicular polarizations may be received by the polarization-splitting grating coupler 303, communicated via the waveguides 311, converted to an electrical signal by the photodetector 305, with the resulting electrical signals communicated to the electronics die 205 via the Cu pillars 207. The electrical signals may be further processed by electronics in the electronics die 205 and/or communicated to other circuitry via wire bonds or the Cu pillars 207 and the TSVs 309.

The silicon photonic interposer 203 comprises a CMOS photonics die that may provide photonic circuits for a plurality of electronics die, thereby reducing or eliminating electrical interconnects between high-speed electronics. This may be utilized for high-speed memory access, high-speed processor interconnects, and coupling a plurality of high-speed electronics chips, for example. In an example scenario, the interposer 203 may comprise a plurality of reticle sections 203A and 203B, although the number is not limited to two, as this is merely an example. The reticle sections 203A and 203B may each comprise a section of the interposer formed in a mask step, where a different reticle may be used for each section due to the large overall size of the interposer 203. To avoid optical losses due to possible mismatches at the interfaces, such as the interface 313 between reticle sections 203A and 203B, optical waveguides may be tapered to broaden the optical modes at the interfaces and then taper back down away from the interfaces.

Figure 4:
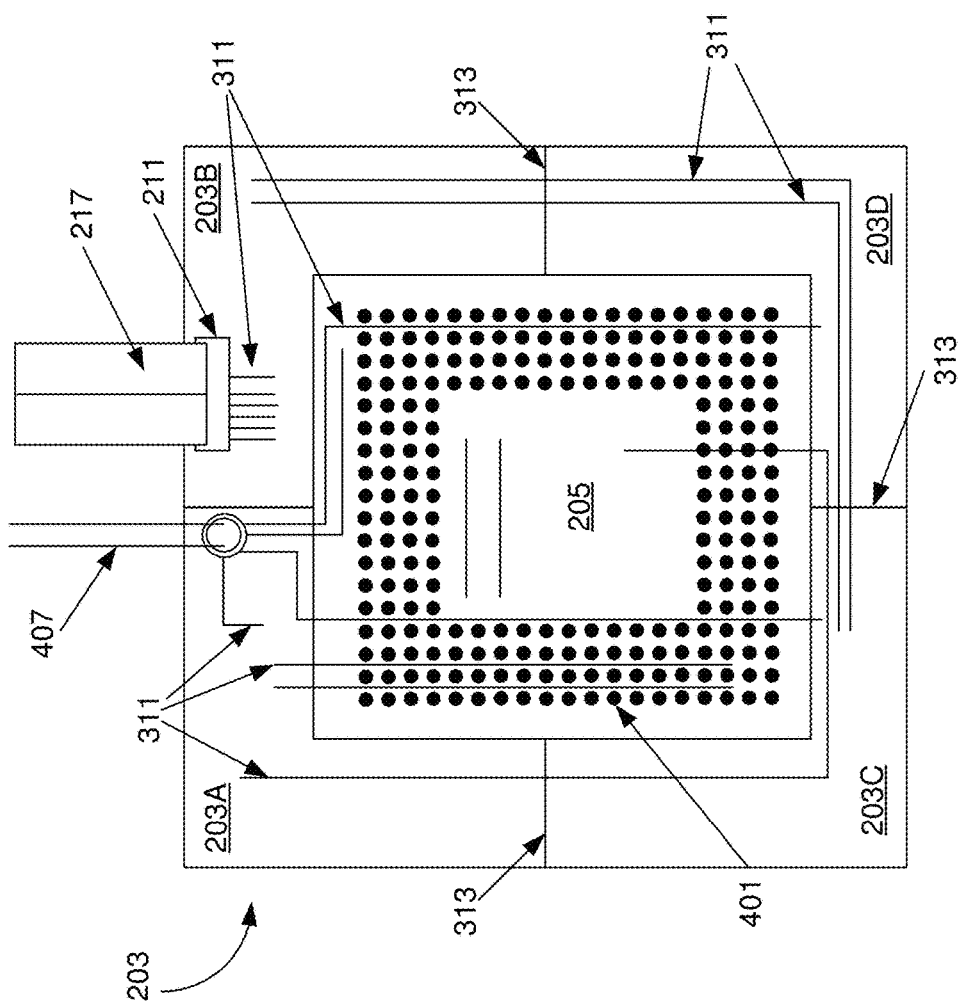
FIG. 4 is a diagram illustrating a photonic interposer with multiple sections coupled to a single electronics die, in accordance with an embodiment of the disclosure.

FIG. 4 is a diagram illustrating a photonic interposer with multiple sections coupled to a single electronics die, in accordance with an embodiment of the disclosure. Referring to FIG. 4, there is shown a CMOS photonics interposer 203, electronics die 205, optical I/O 211, electrical interconnects 401, optical fibers 217, optical waveguides 311, and optical source 407. The electrical interconnects 401 may comprise copper pillars, for example, but may comprise any electrical interconnect structure such as metal bumps or micro bumps. As described previously, the interposer 203 may comprise a plurality of sections 203A-203D, that each may comprise different reticle sections with interfaces 313 between the sections.

FIG. 4 shows a transparent view of the silicon photonic interposer 203 and the electronics die 205 to illustrate the waveguides 311 and the electrical interconnects 401. For example, sets of optical waveguides 311 are shown coupling the optical I/Os 211 to specific regions of the silicon photonic interposer 203, such that electrical signals may then be communicated to/from the electronics die 205 in those regions. Similarly, the optical waveguides 311 couple the optical source 407 to regions of the silicon photonic interposer 203 for subsequent modulation by modulators located under associated circuitry in the electronics die 205, thereby distributing the optical source signal throughout the CMOS optical interposer 203 for use by each of the electronics die 205 when converted to electrical signals, such as by photodiodes, for example.

The electrical interconnects 401 may be arranged around the perimeter of the electronics die 205 and/or centered on the die, as shown in FIG. 4. Similarly, TSVs may be placed throughout the silicon photonic interposer 203 for providing electrical contact between devices in the electronics die 205 and a PCB/substrate 201. Accordingly, TSVs are integrated below some of the electrical interconnects 401.

Due to the very high bandwidth capability of single-mode optical communication, the electronic die 205 may be capable of communicating at over 1 terabit per second via the interposer 203. For example, utilizing ~20 micron Cu pillars with <20 fF capacitance, speeds of 50 GHz and higher can be achieved. Thus, by integrating a plurality of signals in the waveguides 311 and subsequently the optical fibers 217, terabits speeds are enabled.

Figure 5A:
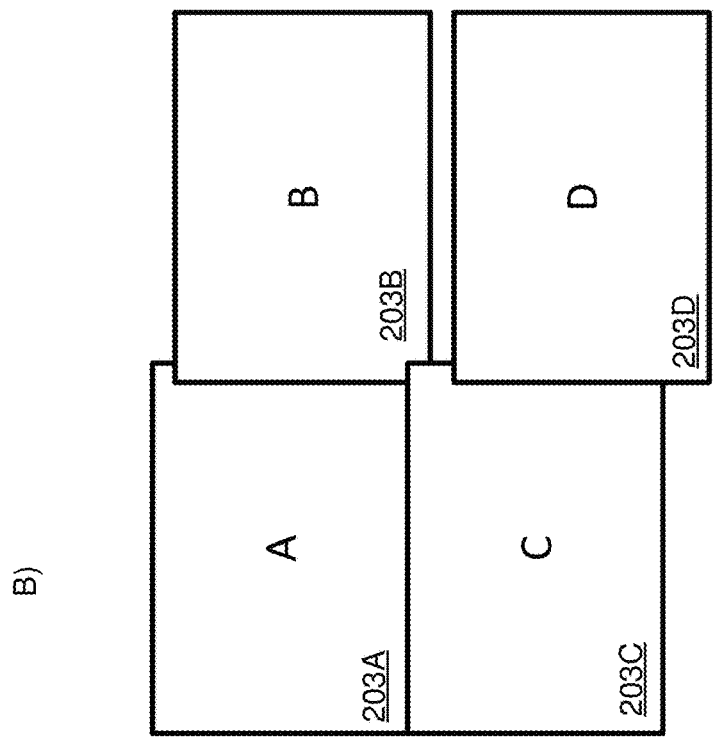
FIGS. 5A-5B illustrate multiple reticles in an interposer wafer, in accordance with an example embodiment of the disclosure.
Figure 5B:
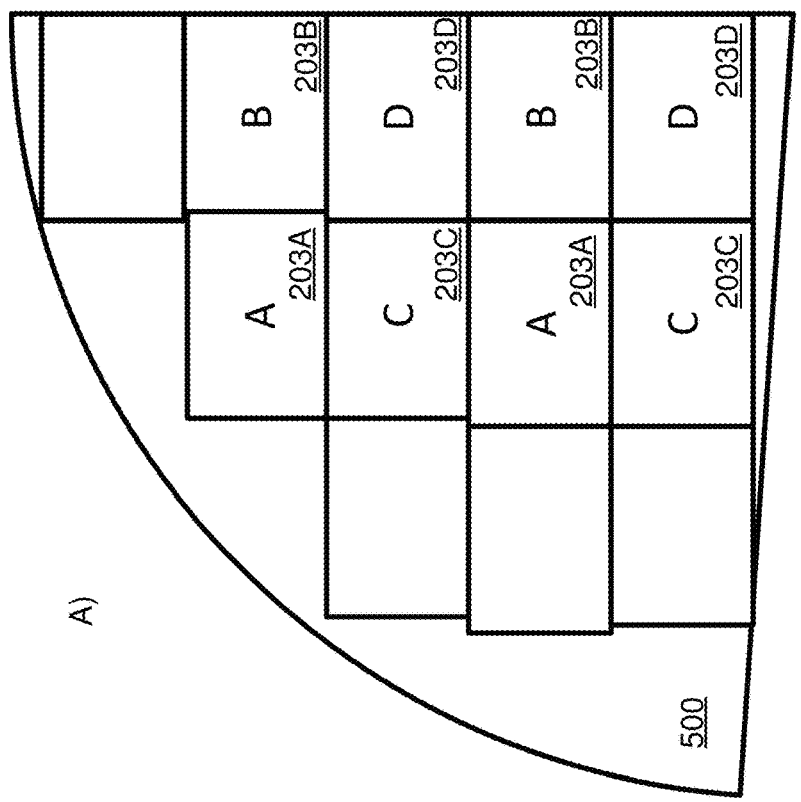

FIGS. 5A-5B illustrate multiple reticles in an interposer wafer, in accordance with an example embodiment of the disclosure. Referring to FIG. 5A, there is shown a wafer 500 comprising a plurality of sections 203A-203D, where each of the sections 203A-203D represent a different reticle, for example, and in an example embodiment the arrangement of four adjacent sections 203A-203D may represent a single interposer.

FIG. 5B illustrates a single interposer comprising one of each of the different reticle sections 203A-203D, but with exaggerated misalignment. This type of misalignment might not have serious consequences for electronic circuits, but may cause large optical losses for waveguides that traverse the interfaces between the reticle sections 203A-203D. These losses may be mitigated by tapering the waveguides to broaden the optical modes near the interfaces while tapering back down away from the interfaces. This is shown further with respect to FIG. 6.

Figure 6:
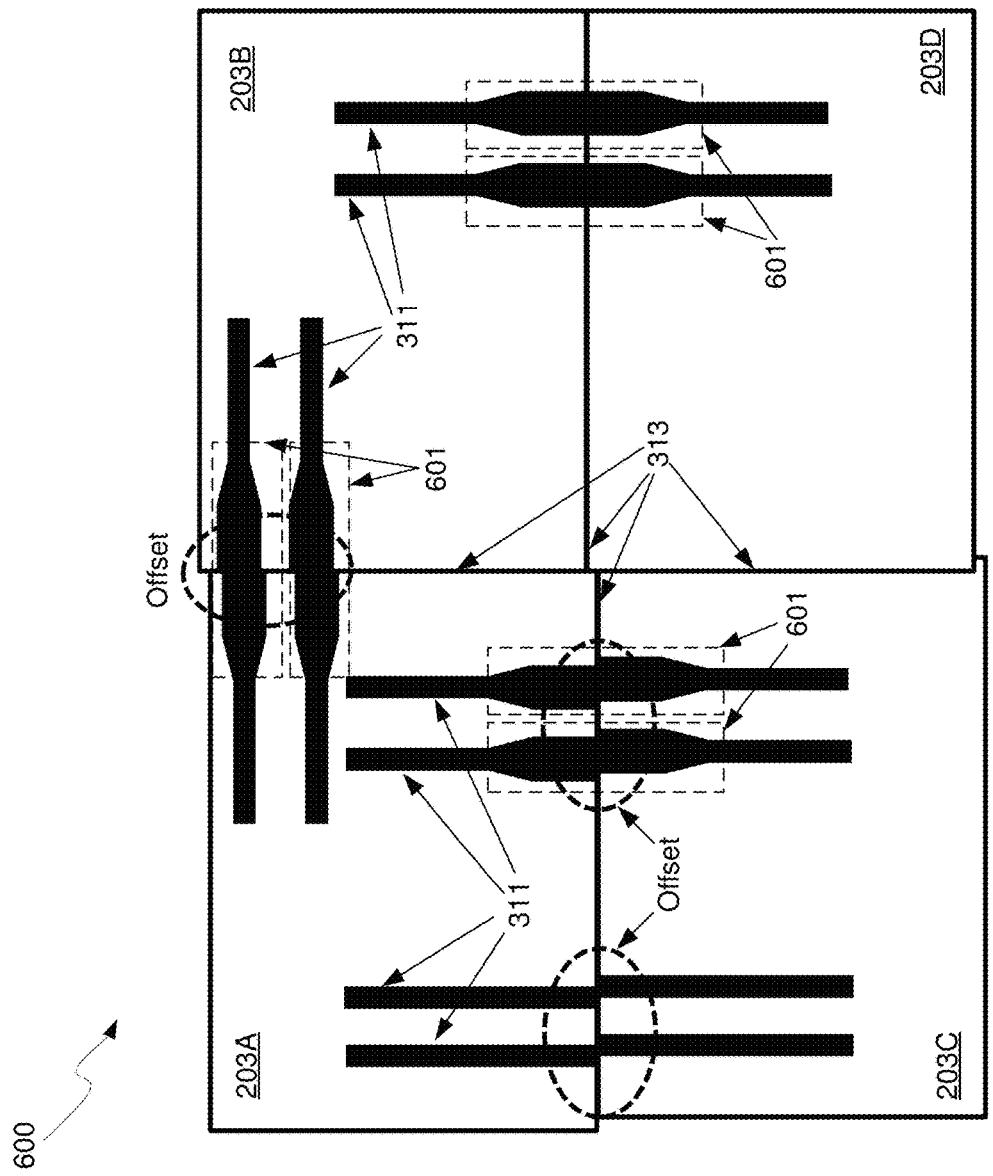
FIG. 6 is a diagram illustrating waveguides at the interfaces between reticle sections of a large area silicon interposer, in accordance with an embodiment of the disclosure.

FIG. 6 is a diagram illustrating waveguides at the interfaces between reticle sections of a large area silicon interposer, in accordance with an embodiment of the disclosure. Referring to FIG. 6, there is shown an interposer 600 comprising reticle sections 203A-203D, where waveguides 311 are arranged across the sections of interposer 600. It should be noted that the illustrated waveguides 311 are a simplified case merely to illustrate waveguides that cross the interfaces.

In instances where the waveguides 311 cross the interfaces between the different reticle sections 313, optical losses may arise with the straight waveguides 311 that do not have taper regions 601, due to the misalignment, or "stitching errors,' of the sections 203A-203D. However, for waveguides 311 with taper regions 601, the optical modes may be larger at the interfaces 313 and thus less susceptible to offsets. It should also be noted that the stitching errors at the interfaces are exaggerated for illustrative purposes.

In an embodiment of the disclosure, a method and system are disclosed for large silicon photonic interposers by stitching. In this regard, aspects of the disclosure may comprise, in an integrated optical communication system comprising one or more complementary metal-oxide semiconductor (CMOS) electronics die coupled to a silicon photonic interposer, where the silicon photonic interposer comprises a plurality of reticle sections: communicating an optical signal between two of said plurality of reticle sections utilizing a waveguide. The waveguide may comprise a taper region at a boundary between the two reticle sections, the taper region expanding an optical mode of the communicated optical signal prior to the boundary and narrowing the optical mode after the boundary.

A continuous wave (CW) optical signal may be received in a first of the plurality of reticle sections in the silicon photonic interposer from an optical source external to the silicon photonic interposer. The CW optical signal may be received in the silicon photonic interposer from an optical source assembly coupled to a grating coupler in the first reticle section in the silicon photonic interposer. The CW optical signal may be communicated from the first reticle section to a second reticle section utilizing a second waveguide.

A modulated optical signal may be generated by processing the received CW optical signal based on a first electrical signal received from one of the CMOS electronics die. The received CW optical signal may be processed utilizing an optical modulator in the silicon photonic interposer. The generated modulated optical signal may be communicated between two of the plurality of reticle sections. A second electrical signal may be generated in the silicon photonic interposer using a photodetector integrated in the silicon photonic interposer. The CW optical signal may be received from an optical fiber coupled to one of the reticle sections of the silicon photonic interposer. The taper region may comprise a region of expansion increasing from a first width up to a second width, a region extending across the boundary between the two reticle sections at the second width, and a region tapering back down to the first width.

While the disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiments disclosed, but that the present disclosure will include all embodiments falling within the scope of the appended claims.

What is claimed is:

1. A method for communication, the method comprising:
   in an optical communication system comprising a silicon photonic interposer, wherein the silicon photonic interposer comprises a plurality of reticle sections:
   communicating an optical signal between two of said plurality of reticle sections utilizing a waveguide, wherein said waveguide comprises an increased width at a boundary between said two of said plurality of reticle sections, said increased width expanding an optical mode of said communicated optical signal prior to said boundary and narrowing said optical mode after said boundary.

2. The method according to claim 1, comprising receiving a continuous wave (CW) optical signal in a first of said plurality of reticle sections in said silicon photonic interposer from an optical source external to said silicon photonic interposer.

3. The method according to claim 2, comprising receiving said CW optical signal in said silicon photonic interposer from an optical source assembly coupled to a grating coupler in said first of said plurality of reticle sections in said silicon photonic interposer.

4. The method according to claim 2, comprising communicating said CW optical signal from said first of said plurality of reticle sections to a second of said plurality of reticle sections utilizing a second waveguide.

5. The method according to claim 2, comprising generating a modulated optical signal by processing said received CW optical signal based on a first electrical signal received from a silicon electronics die coupled to said silicon photonic interposer.

6. The method according to claim 5, comprising processing said received CW optical signal utilizing an optical modulator in said silicon photonic interposer.

7. The method according to claim 5, comprising communicating said generated modulated optical signal between two of said plurality of reticle sections.

8. The method according to claim 7, comprising generating a second electrical signal using a photodetector integrated in said silicon photonic interposer.

9. The method according to claim 2, comprising receiving said CW optical signal from an optical fiber coupled to said first of said plurality of reticle sections of said silicon photonic interposer.

10. The method according to claim 1, wherein said increased width comprises a region of expansion from a first width up to a second width, a region extending across said boundary between said two of said plurality of reticle sections at said second width, and a region tapering back down to said first width.

11. A system for communication, the system comprising:
an optical communication system comprising a silicon photonic interposer, wherein the silicon photonic interposer comprises a plurality of reticle sections, said integrated optical communication system being operable to:
communicate an optical signal between two of said plurality of reticle sections utilizing a waveguide, wherein said waveguide comprises an increased width at a boundary between said two of said plurality of reticle sections, said increased width expanding an optical mode of said communicated optical signal prior to said boundary and narrowing said optical mode after said boundary.

12. The system according to claim 11, wherein said optical communication system is operable to receive a continuous wave (CW) optical signal in a first of said plurality of reticle sections in said silicon photonic interposer from an optical source external to said silicon photonic interposer.

13. The system according to claim 12, wherein said optical communication system is operable to receive said CW optical signal in said silicon photonic interposer from an optical source assembly coupled to a grating coupler in said one of first of said plurality of reticle sections in said silicon photonic interposer.

14. The system according to claim 12, wherein said optical communication system is operable to communicate said CW optical signal from said first of said plurality of reticle sections to a second of said plurality of reticle sections utilizing a second waveguide.

15. The system according to claim 12, wherein said optical communication system is operable to generate a modulated optical signal by processing said received CW optical signal based on a first electrical signal received from a silicon electronics die coupled to said silicon photonics interposer.

16. The system according to claim 15, wherein said optical communication system is operable to process said received CW optical signal utilizing an optical modulator in said silicon photonic interposer.

17. The system according to claim 11, wherein said optical communication system is operable to communicate said generated modulated optical signal between two of said plurality of reticle sections.

18. The system according to claim 17, wherein said optical communication system is operable to generate a second electrical signal using a photodetector integrated in said silicon photonic interposer.

19. The system according to claim 11, wherein said increased width comprises a region of expansion from a first width up to a second width, a region extending across said boundary between said two of said plurality of reticle sections at said second width, and a region tapering back down to the first width.

20. A system for communication, the system comprising:
an optical communication system comprising a silicon photonic interposer, wherein the silicon photonic interposer comprises a plurality of reticle sections, said integrated optical communication system being operable to:
communicate an optical signal between two of said plurality of reticle sections utilizing a waveguide, wherein said waveguide comprises an increased width at a boundary between said two of said plurality of reticle sections, said increased width comprising a region of expansion from a first width increasing to a second width, a region extending across said boundary between said two of said plurality of reticle sections at said second width, and a region tapering back down to said first width.

* * * * *